(No Model.)
J. S. & A. RAY.
HANDLE FOR KNIVES, FORKS, AND ANALOGOUS ARTICLES.
No. 269,108. Patented Dec. 12, 1882.
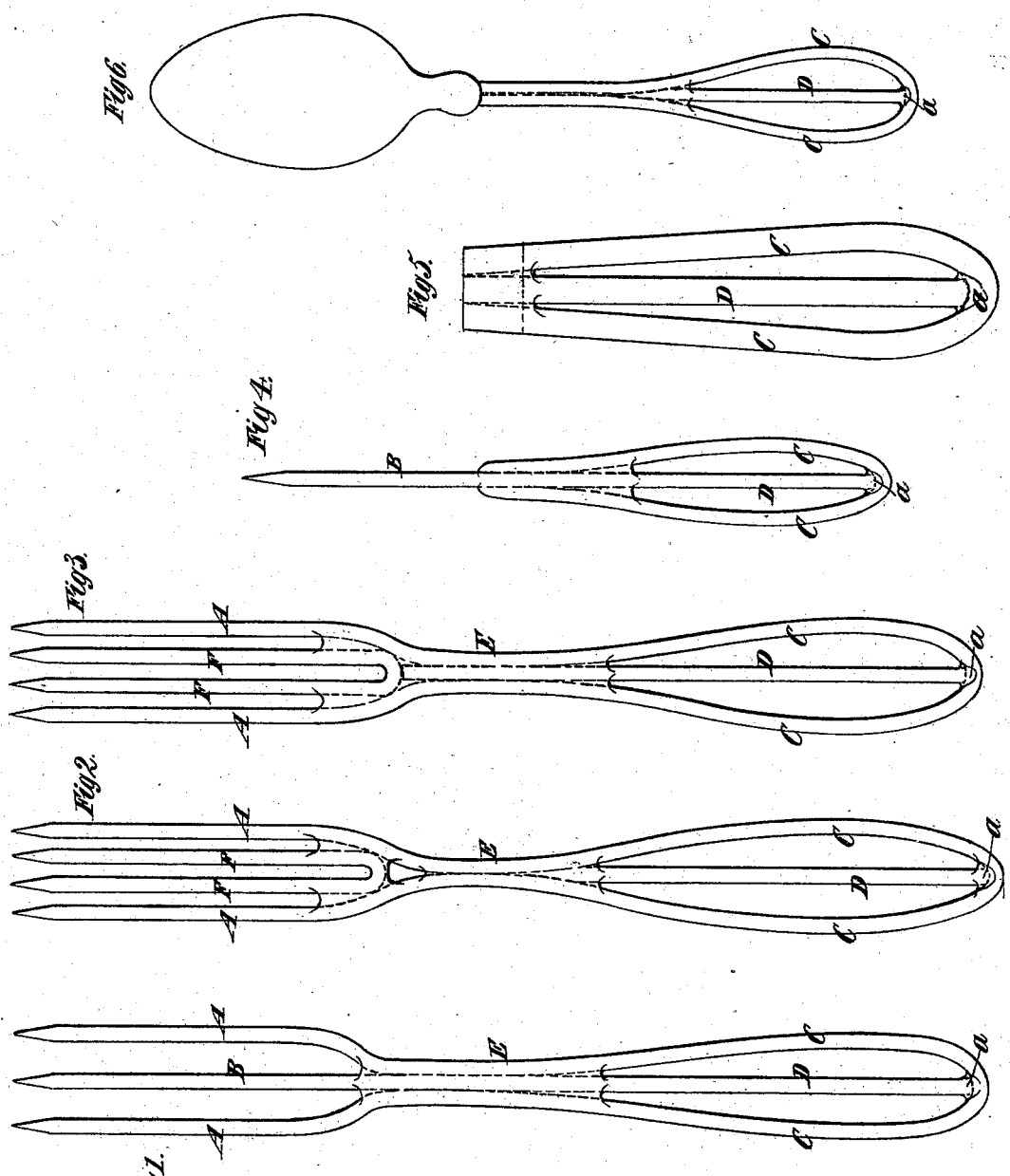

UNITED STATES PATENT OFFICE.

JAMES S. RAY AND ASHBEL RAY, OF EAST HADDAM, CONN.

HANDLE FOR KNIVES, FORKS, AND ANALOGOUS ARTICLES.

SPECIFICATION forming part of Letters Patent No. 269,108, dated December 12, 1882.

Application filed May 8, 1882. (No model.)

*To all whom it may concern:*

Be it known that we, JAMES S. RAY and ASHBEL RAY, of East Haddam, in the county of Middlesex and State of Connecticut, have invented a new and useful Improvement in Handles for Forks, Spoons, Knives, and other Articles of Table-Ware, of which the following is a specification.

Our invention relates to the class of goods commonly known as "flat ware," comprising knives, forks, spoons, ladles, nut-picks, &c.; and the principal object of our invention is to provide a very strong and desirable handle for a knife, fork, or analogous article, which is made of wire.

To this end our invention consists in a handle for a knife, fork, or analogous article of flat ware, composed of a piece of wire bent to form a loop, and a wire or other brace extending lengthwise of said loop, and secured therein by soldering or brazing at the spring and bow of the loop only.

In the accompanying drawings we have represented several articles of flat ware, all of which embody our invention.

Figure 1 is a three-pronged fork. Fig. 2 is a four-pronged fork. Fig. 3 is a four-pronged fork of slightly modified construction. Fig. 4 is a nut-pick. Fig. 5 is a knife-handle, and Fig. 6 is a spoon.

Similar letters of reference designate corresponding parts in all the figures.

Referring first to Fig. 1, A A designate the two outer tines or prongs. B designates the inner or middle tine or prong. C designates the outer contour of the handle, and D designates a brace which extends lengthwise through the handle, the parts C and D from-ing together a skeleton handle for the fork. The two outer tines or prongs, A, and the outer contour or sides, C, of the handle are composed of a single piece of iron, steel, or other wire. This wire is bent at about the middle of its length to form a loop for the handle. Beyond the loop its two portions extend nearly parallel and at a little distance apart to form the shank E, and beyond the shank the two portions of the wire are bent outward or diverge, so as to give the outer prongs or tines the proper spread. The middle tine or prong, B, and the brace D are formed of a single piece of wire soldered or brazed at *a* to the rounded bow of the loop, and extending through the shank E, beyond which it is prolonged to form the tine or prong. The three portions of wire which combine to form the shank E are all soldered or brazed together to strengthen the fork and give it proper rigidity, and the brace D is therefore soldered in the loop at the spring thereof.

Referring now to Fig. 2, it will be observed that the outer or outside tines or prongs, A, and the outer contour, C, of the handle are formed of a single piece of wire, which is looped and bent, as before described. The two inner or intermediate tines or prongs F are formed of a piece of wire, which is bent into proper shape so that its end portions are parallel, and is secured between the outer tines by solder or brazing. The shank E is formed solely by soldering or brazing together the two portions of the wire which form the outer tines, A, and the brace D extends only from end to end of the loop.

The fork shown in Fig. 3 differs from that shown in Fig. 2 only in that the brace D is continued through the shank E, as in Fig. 1. The nut-pick shown in Fig. 4 is composed of two pieces of wire, one of which is bent to form a loop, C, and the outer of which forms a brace, D, and is soldered or brazed to the rounded bow of the loop at *a*. The brace D is secured between the end portions of the first-mentioned wire in the spring of the loop by brazing or soldering, and is prolonged to form a tine or prong, B.

The knife-handle shown in Fig. 5 is composed of a loop, C, made of one piece of wire, and a brace, D, which is soldered or brazed at one end to the bow of the loop at *a*, and has its opposite end secured by solder or brazing between the end portions of the looped wire at the spring of the loop.

The handle of the spoon shown in Fig. 6 is also composed of a loop, C, formed of one piece of wire, and a brace, D, secured to the loop at *a* by soldering or brazing.

Although either soldering or brazing may be used to connect the several parts of the forks and handles before described, we prefer the former, as the wire will not then be annealed, as it would be by brazing.

These articles may be plated or otherwise finished, and are also very desirable, for the reason that when the plating wears off the iron or steel wire does not become poisonous by corrosion.

We do not here claim the fork having its tines or prongs formed as herein described; but such feature may form the subject of another application for Letters Patent.

What we claim as our invention, and desire to secure by Letters Patent, is—

A handle for a knife, fork, or analogous article, composed of a piece of wire bent to form a loop, and a brace extending lengthwise of said loop and secured therein by being soldered or brazed at the spring and bow of the loop only, substantially as herein described.

JAMES S. RAY.
ASHBEL RAY.

Witnesses:
F. L. RAY,
JULIUS ATTWOOD.